United States Patent [19]
Hsieh

[11] Patent Number: 5,094,092
[45] Date of Patent: Mar. 10, 1992

[54] AUTO VEHICLE PEDAL LOCK

[76] Inventor: Tung-Chiang Hsieh, No. 80-2, Lane 57, Sec. 2, Jin Hwa Rd., Tainan City, China

[21] Appl. No.: 741,347

[22] Filed: Aug. 7, 1991

[51] Int. Cl.$^5$ ............................................. E05B 65/12
[52] U.S. Cl. ...................................... 70/199; 70/202; 70/238
[58] Field of Search .................... 70/237–239, 70/254, 198–203, 14, 246

[56] References Cited

U.S. PATENT DOCUMENTS

| | | | |
|---|---|---|---|
| 1,179,275 | 4/1916 | Bruehne | 70/199 |
| 1,444,935 | 2/1923 | Mokracek | 70/200 |
| 1,582,498 | 4/1926 | Wilkerson | 70/200 |
| 5,005,391 | 4/1991 | Gibson | 70/238 |

FOREIGN PATENT DOCUMENTS

| | | | |
|---|---|---|---|
| 2546831 | 12/1984 | France | 70/237 |
| 160160 | 12/1921 | United Kingdom | 70/200 |
| 2114205 | 8/1983 | United Kingdom | 70/237 |

*Primary Examiner*—Lloyd A. Gall
*Attorney, Agent, or Firm*—Bacon & Thomas

[57] ABSTRACT

An auto vehicle pedal lock is adapted to securely lock the control pedals of a vehicle having a recess being cast molded to the center position of the main body, two hooks respectively molded to the two ends with each opening facing outwardly, and two legs securely anchored to the underside of respective ends. The height of the two hooks may be molded differently so as to fit different vehicle having the control pedals at different height. The two legs are also formed with different height corresponding to respective hooks so as to prevent stepping any of the control pedals down illegally.

3 Claims, 3 Drawing Sheets

AUTO VEHICLE PEDAL LOCK

FIELD OF THE INVENTION

This invention relates to a lock for auto vehicle. More particularly, a lock secures the pedals of a vehicle to prevent illegal operating of the vehicle.

BACKGROUND OF PRIOR ART

The known prior art of automobile locks are mostly in two different types. The first type includes two hooks at two ends to hook a control pedal and the steering wheel respectively to prevent illegal operating either the pedal or the steering wheel. The second type also includes two hooks to be engaged to a steering wheel in a diametrically opposing manner and having an extending lock body beyond the perimeter of the steering wheel to prevent illegal operating the steering wheel by engaging the extending lock body with either driver or the instrument panel.

However, both of which exist some problems. For instance, the first type may be rendered ineffective by loosen the screw which connects the steering wheel to the shaft, and the second type may be broken by brute force.

It is, therefore, a main object of the present invention to provide a more safety antitheft vehicle lock.

SUMMARY OF THE INVENTION

It is the primary object of the present invention to provide an auto vehicle pedal lock which prevent illegal operating of the control pedals.

It is still another object of the present invention to provide an auto vehicle pedal lock which is difficult to break through by brute force.

It is a further object of the present invention to provide an auto vehicle pedal lock which is suitable to all models of vehicles.

Although the novel features which are believed to be characteristic of the invention are pointed out in the annexed claims, the invention, as to its objects and advantages may be better understood by reference to the following description taken in connection with the accompanying drawings forming a part thereof.

DETAILED DESCRIPTION OF THE PREFERRED EMBODIMENT

Figure 1:
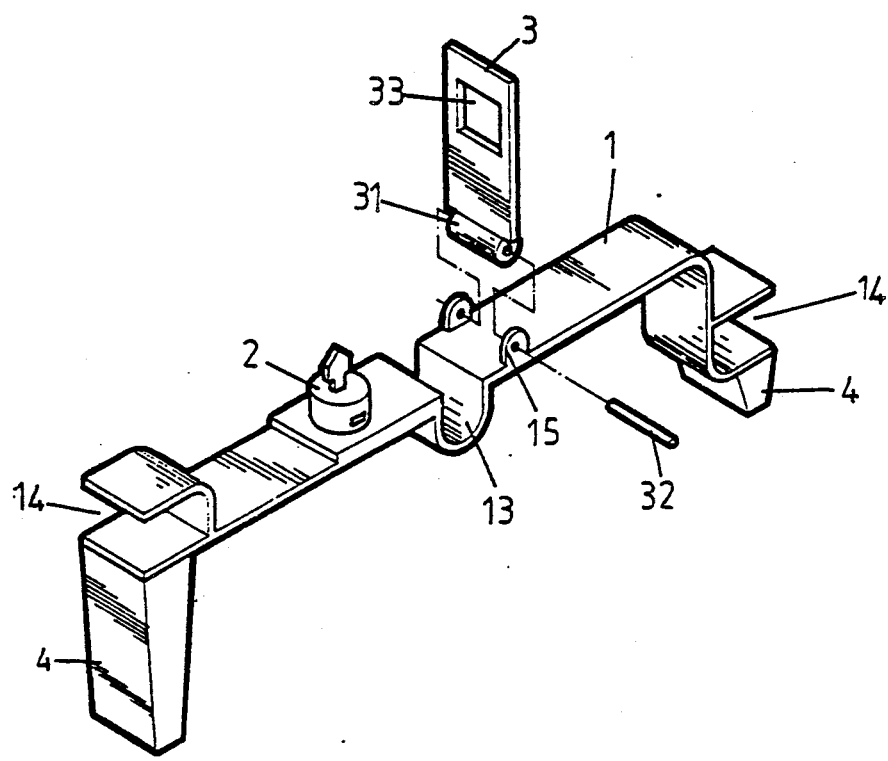
FIG. 1 is a perspective view of the present invention.

Referring to the drawings wherein the showings are for the purpose of illustrating preferred embodiments of the invention and not for the purpose of limiting the same FIG. 1 shows the present invention composed of a baseplate 1 being cast molded to form a recess 13 at middle portion with its opening facing upwardly, two U-shaped hooks 14 at respective ends with each opening facing outwardly, and two lugs 15 at two edges of one side of the recess 13 extending upwardly and having a hole at respective center portions. The present invention further has a lock mechanism 2 at the other side of the recess 13 opposing the two lugs 15, a lid 3 having a square aperature 33 and a connecting post 31 at the other end having a passage therethrough for hingedly mounting to the baseplate 1 by inserting a pin 32 through one lug 15 then into the passage and finally come out of another lug 15, and two legs 4 secured to the bottom portion of respective ends. The height of each leg 4 is different from the other depending upon the distance between each hook 14 and the floor of the vehicle in order to maintain the lock to be steadily standing on the floor of the vehicle when it is in locked position.

Figure 2:
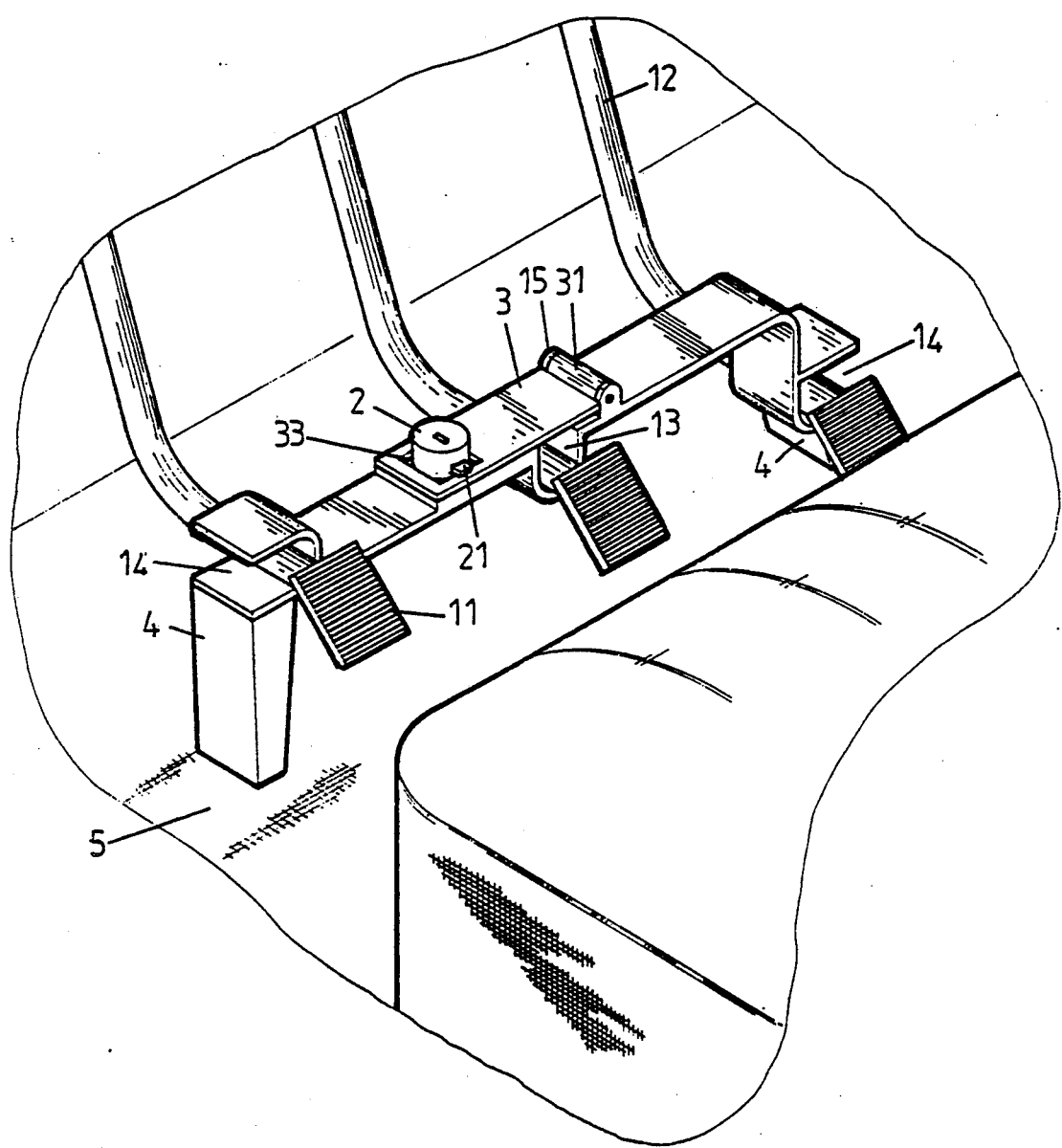
FIG. 2 is another perspective view of FIG. 1 being installed in a vehicle.

In operation, for an installation, initially the baseplate 1 is placed on the floor of a vehicle with the recess 13 to accommodate the stem 12 of the brake control pedal 11 and with the two U-shaped hooks 14 to accommodate respective stems 12 of the gas and clutch control pedals 11 which generally are arranged at two sides of the brake pedal 11. When each stem 12 is correctly positioned, the lid 3 is pushed down with the square aperature 33 passing through the lock mechanism 2 and lies on the baseplate 1 to close the opening end of the recess 13. By operating a valid key to urge a tongue 21 extending out of the lock and across over a portion of the lid 3, as shown in FIG. 2, thus the lock is securely locked and confines any illegal operating of any of the control pedals 11.

Figure 3:
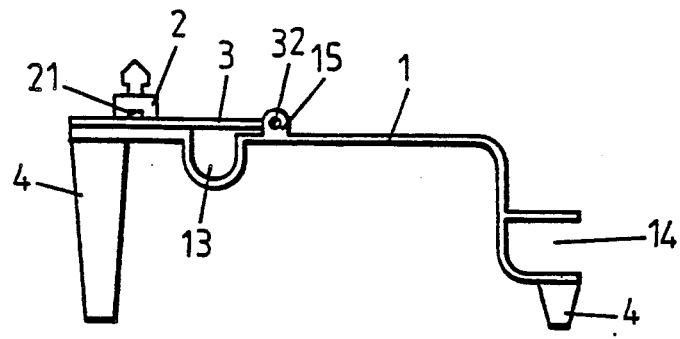
FIGS. 3, 4, and 5 are side views of another embodiment of FIG. 1.

The above description and illustration is taken a standard transmission vehicle as an example. The present invention has another embodiment, as shown in FIG. 3 which has a hook 14 at one side only of the baseplate 1 for the use with an automatic transmission vehicle. This embodiment has deleted one of the hooks 14 used for the clutch control pedal 11.

Figure 4:
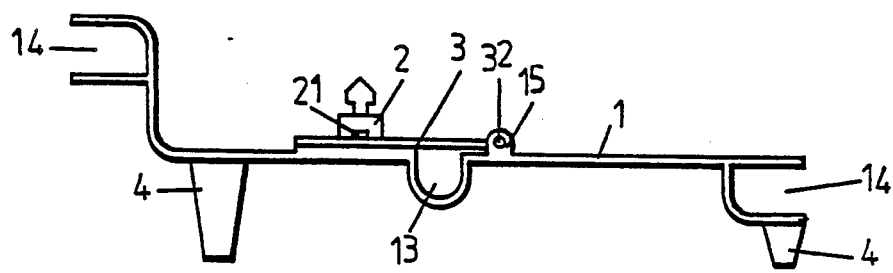
Figure 5:
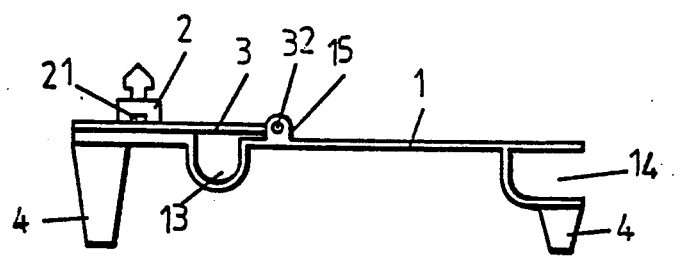

Other embodiments have also been developed to provide the hooks with different height for the purposes of adapting to the vehicle having the control pedals at different height level, as shown in FIGS. 4 and 5. Subsequently, the legs 4 are provided with different height so as to allow the baseplate 1 to stand steadily on the floor of the vehicle and to prevent control pedals from being pushed downwardly.

The terms and expressions which have been employed herein are used as terms of description and not of limitation and there is no intention in the use of such terms and expressions of excluding any equivalent of the features shown and described, or portions thereof, but it is recognized that variations in the detailed of the embodiments specifically illustrated and described may be made without departing from the spirit and scope of the invention as defined in the appended claims.

What is claimed is:

1. An auto vehicle pedal lock comprising:
   a baseplate having a recess casting formed a middle portion with its opening facing upwardly, at least one hook at least one end of said baseplate having an opening facing outwardly, and two lugs at respective edges of one side of said recess;
   a lock mechanism being located on top of said baseplate at one side of said recess opposing said two lugs, and operable by a valid key to extend or to retract a tongue;
   a lid having a square aperature at one end and a connecting post at the other end having a passage extending therethrough to be connected with said two lugs of said baseplate;
   two legs anchored and to the underside of respective ends.

2. An auto vehicle pedal lock as claimed in claim 1, wherein said baseplate has two hooks at respective ends of the baseplate facing outwardly.

3. An auto vehicle pedal lock claimed as in claim 2, wherein said two hooks are formed at different heights from said baseplate, and wherein said legs are formed with different heights corresponding to the heights of respective said hooks.

* * * * *